(12) United States Patent
Emoto et al.

(10) Patent No.: US 11,685,404 B2
(45) Date of Patent: Jun. 27, 2023

(54) AUTONOMOUS DRIVING CONTROL METHOD AND AUTONOMOUS DRIVING CONTROL SYSTEM

(71) Applicants: Nissan Motor Co., Ltd., Yokohama (JP); Renault S.A.S., Boulogne-Billancourt (FR)

(72) Inventors: Shuhei Emoto, Kanagawa (JP); Katsuhiko Degawa, Kanagawa (JP); Takahiro Nojiri, Kanagawa (JP); Tatsuya Shino, Kanagawa (JP); Shuko Ishimaru, Kanagawa (JP); Atsushi Ito, Kanagawa (JP); Toshihiro Asai, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 331 days.

(21) Appl. No.: 17/270,890

(22) PCT Filed: Sep. 17, 2018

(86) PCT No.: PCT/IB2018/001583
§ 371 (c)(1),
(2) Date: Feb. 24, 2021

(87) PCT Pub. No.: WO2020/058741
PCT Pub. Date: Mar. 26, 2020

(65) Prior Publication Data
US 2021/0331707 A1 Oct. 28, 2021

(51) Int. Cl.
*B60W 60/00* (2020.01)
*B60W 30/165* (2020.01)

(52) U.S. Cl.
CPC ...... *B60W 60/0027* (2020.02); *B60W 30/165* (2013.01); *B60W 2554/406* (2020.02); *B60W 2554/4041* (2020.02)

(58) Field of Classification Search
CPC .......... B60W 60/0027; B60W 30/165; B60W 2554/4041; B60W 2554/406;
(Continued)

(56) References Cited

U.S. PATENT DOCUMENTS

2006/0173611 A1\* 8/2006 Takagi ............... G01C 21/3655
701/538
2017/0225689 A1\* 8/2017 Mukai .................... B60W 20/11
(Continued)

FOREIGN PATENT DOCUMENTS

JP 2017-162248 A 9/2017
JP 2018-83539 A 5/2018
(Continued)

*Primary Examiner* — Abby Y Lin
*Assistant Examiner* — Danielle Marie Jackson
(74) *Attorney, Agent, or Firm* — Global IP Counselors, LLP

(57) ABSTRACT

An autonomous driving control method carried out by an autonomous driving control system having an autonomous driving control unit that executes an autonomous driving control for causing a host vehicle to travel along a target travel route generated on a map, comprising setting one or a plurality of target passage gates through which the host vehicle is scheduled to pass during passage through a toll plaza, determining the presence or absence of a preceding vehicle that has the predicted passage gate that matches the target passage gate of the host vehicle from among a plurality of preceding vehicles, and carrying out following travel using the preceding vehicle that has the predicted passage gate that matches the target passage gate as a follow target.

5 Claims, 9 Drawing Sheets

(58) Field of Classification Search
CPC ..... B60W 60/00272; B60W 60/00274; B60W 2552/05; B60W 60/00276; B60W 60/0011; B60W 30/16; G01C 21/3407
See application file for complete search history.

(56) References Cited

U.S. PATENT DOCUMENTS

| | | | |
|---|---|---|---|
| 2018/0148070 A1* | 5/2018 | Abe | G05D 1/0061 |
| 2019/0276027 A1* | 9/2019 | Toda | B60W 40/04 |
| 2019/0286160 A1* | 9/2019 | Toda | G05D 1/0214 |
| 2019/0353493 A1* | 11/2019 | Takahashi | G01C 21/3461 |
| 2019/0389463 A1* | 12/2019 | Mizutani | G05D 1/0088 |
| 2020/0239031 A1* | 7/2020 | Ran | G08G 1/017 |
| 2021/0188262 A1* | 6/2021 | Goto | B60W 30/0956 |

FOREIGN PATENT DOCUMENTS

| | | |
|---|---|---|
| JP | 2018-86937 A | 6/2018 |
| WO | 2018/142568 A1 | 8/2018 |

\* cited by examiner

AUTONOMOUS DRIVING CONTROL METHOD AND AUTONOMOUS DRIVING CONTROL SYSTEM

CROSS-REFERENCE TO RELATED APPLICATIONS

This application is a U.S. national stage application of International Application No. PCT/IB2018/001583, filed on Sep. 17, 2018.

BACKGROUND

Technical Field

The present disclosure relates to an autonomous driving control method and autonomous driving control system.

Background Information

A device is known from the prior art that controls an autonomous driving vehicle in which autonomous driving is carried out for passage through a manned toll plaza, when the autonomous driving vehicle passes through the toll plaza of a highway, etc. (for example, see Japanese Laid-Open Patent Application No. 2017-162248 hereinafter referred to as Patent Document 1). In this prior art, when there is a switch from an autonomous driving possible area to an autonomous driving not possible area at a toll plaza, if the handover to manual driving has not been completed, the vehicle is controlled so as to travel through a manned toll plaza and to stop at the manned toll plaza.

SUMMARY

When a target travel route is generated for a host vehicle with a prescribed gate of a toll plaza set as a passage target as in the technique disclosed in Patent Document 1, normally, the target travel route is generated along a route defined in a map database.

However, a line of vehicles sometimes forms at a toll plaza due to traffic congestion, and, at this time, there are cases in which the target travel route defined in the map database will differ due to the line of vehicles that has formed toward the target gate. In this case, if the host vehicle is guided along the target travel route in the map database, there is the risk that the vehicle will deviate from the line of vehicles heading toward the target gate.

In view of the problem described above, an object of the present disclosure is to provide an autonomous driving control method and an autonomous driving control system that are capable of guiding the host vehicle so as not to deviate from the line of vehicles that has formed at the toll plaza.

The autonomous driving control method according to the present disclosure comprises setting a target passage gate for a host vehicle, determining the presence or absence of a preceding vehicle whose predicted passage gate matches the target passage gate, and carrying out following travel using a preceding vehicle of the predicted passage gate that matches the target passage gate as a follow target.

In addition, the autonomous driving control system according to the present disclosure comprises a target passage gate setting unit for setting a target passage gate through which a host vehicle is scheduled to pass, and a preceding vehicle presence/absence determination unit for determining the presence or absence of a preceding vehicle whose predicted passage gate matches the target passage gate of the host vehicle, when passing through a toll plaza. The autonomous driving control system further comprises a following travel control unit that drives an actuator to carry out following travel using the preceding vehicle of the predicted passage gate that matches the target passage gate as the follow target.

Since, in the autonomous driving control method and the autonomous driving control system according to the present disclosure, following travel is carried out with respect to the preceding vehicle of the predicted passage gate that matches the target passage gate of the host vehicle, it is possible to guide the host vehicle to the target passage gate without deviating from the line of vehicles formed at the toll plaza.

BRIEF DESCRIPTION OF THE DRAWINGS

Referring now to the attached drawings which form a part of this original disclosure.

DETAILED DESCRIPTION OF EMBODIMENTS

Embodiments for executing an autonomous driving control method and an autonomous driving control system according to the present disclosure will be described below based on the drawings.

First Embodiment

The autonomous driving control method and the autonomous driving control system according to the first embodiment are applied to an autonomous driving vehicle (one example of a driving-assisted vehicle) in which driving, braking, and steering angle are automatically controlled so as to effect travel along a generated target travel route when an autonomous driving mode is selected.

Figure 1:
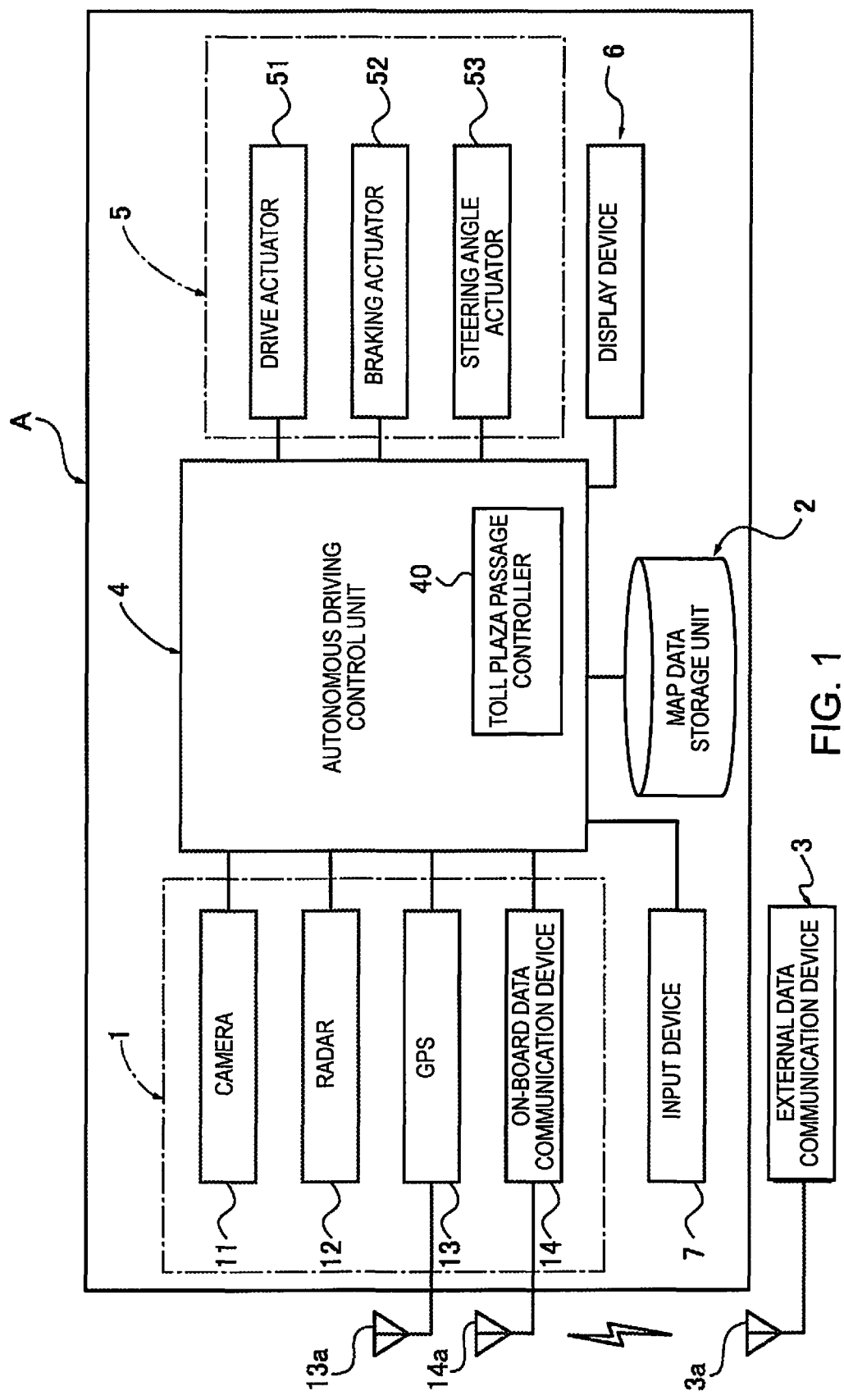
FIG. 1 is an overall system view illustrating an autonomous driving control system A that executes an autonomous driving control method according to a first embodiment.

FIG. 1 illustrates an autonomous driving control system A to which the autonomous driving control method and the autonomous driving control system according to the first embodiment are applied. The overall system configuration will be described below based on FIG. 1.

The autonomous driving control system A comprises an on-board sensor 1, a map data storage unit 2, an external data communication device 3, an autonomous driving control unit 4, an actuator 5, a display device 6, and an input device 7.

The on-board sensor 1 includes a camera 11, a radar 12, a GPS 13, and an on-board data communication device 14. In addition, sensor information acquired with the on-board sensor 1 is output to the autonomous driving control unit 4.

The camera 11 is a surroundings recognition sensor that realizes a function to acquire, by use of image data, peripheral information of the host vehicle MVS (refer to FIG. 3) such as lanes, preceding vehicles (refer to preceding vehicles PV1, PV2 in FIG. 4), pedestrians, and the like, as a function required for autonomous driving. This camera 11 is configured, for example, by combining a front recognition camera, a rear recognition camera, a right recognition camera, a left recognition camera, and the like of the host vehicle MVS (refer to FIG. 3). The host vehicle MVS is a vehicle in an automatic driving control system A is installed, and indicates the vehicle being controlled.

It is possible to detect, from camera images, objects and lanes on a host vehicle travel path and objects outside of the host vehicle travel path (road structures, preceding vehicles, trailing vehicles, oncoming vehicles, surrounding vehicles, pedestrians, bicycles, two-wheeled vehicles), the host vehicle travel path (white road lines, road boundaries, stop lines, pedestrian crossings, road signs, speed limits, etc.), and the like.

The radar 12 is a ranging sensor that realizes a function to detect the presence of an object in the vicinity of the host vehicle and a function to detect the distance to the object in the vicinity of the host vehicle, as functions required for autonomous driving. Here, "radar 12" is a generic term that includes radars using radio waves, lidars using light, and sonars using ultrasonic waves. Examples of a radar 12 that can be used include a laser radar, a millimeter wave radar, an ultrasonic radar, a laser range finder, or the like. This radar 12 is configured, for example, by combining a front radar, a rear radar, a right radar, a left radar, and the like of the host vehicle.

The radar 12 detects the positions of objects on a host vehicle travel path and objects outside of the host vehicle travel path (road structures, preceding vehicles, trailing vehicles, oncoming vehicles, surrounding vehicles, pedestrians, bicycles, two-wheeled vehicles), as well as the distance to each object. If the viewing angle is insufficient, radars may be added as deemed appropriate.

The GPS 13 is a host vehicle position sensor that has a GNSS antenna 13a and that detects the host vehicle position (latitude and longitude) when the vehicle is stopped or in motion by using satellite communication. "GNSS" is an acronym for "Global Navigation Satellite System" and "GPS" is an acronym for "Global Positioning System."

Figure 3:
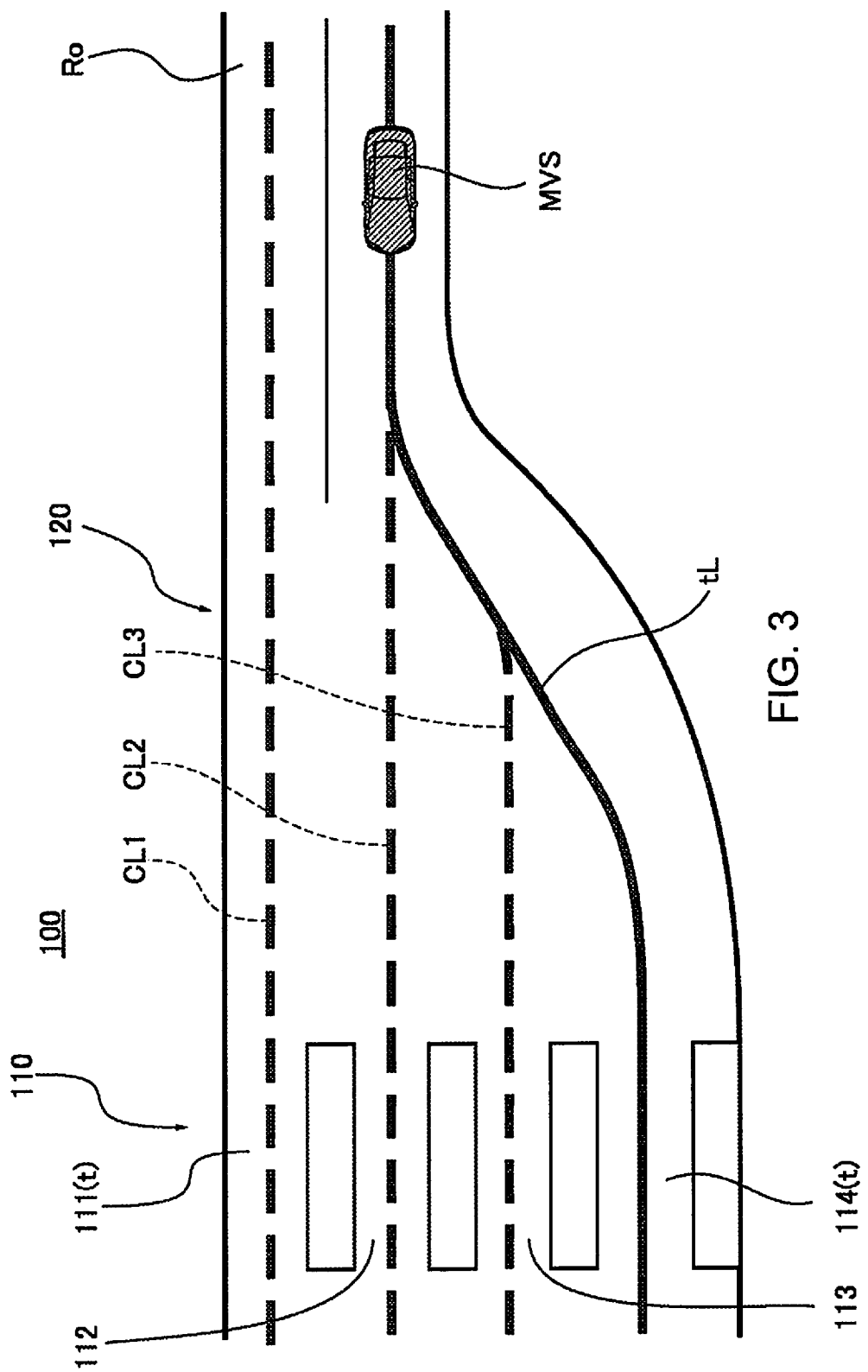
FIG. 3 is a plan view illustrating one example of atoll plaza 100 at which the toll plaza passage control by the toll plaza passage controller 40 is executed, and one example of a target travel route tL generated on a map.

The on-board data communication device 14 is an external data sensor that carries out wireless communication with the external data communication device 3 via transceiver antennas 3a, 14a to thereby acquire information from the outside that cannot be acquired by the host vehicle MVS (refer to FIG. 3).

For example, in the case of a data communication device mounted on another vehicle traveling in the vicinity of the host vehicle MVS (refer to FIG. 3), the external data communication device 3 carries out vehicle-to-vehicle communication between the host vehicle MVS (refer to FIG. 3) and the other vehicle. By means of this vehicle-to-vehicle communication, information needed by the host vehicle MVS (refer to FIG. 3) can be acquired from among the various pieces of information held by the other vehicle by means of a request from the on-board data communication device 14.

For example, in the case of a data communication device provided in infrastructure equipment, the external data communication device 3 carries out infrastructure communication between the host vehicle MVS (refer to FIG. 3) and the infrastructure equipment. By means of this infrastructure communication, information needed by the host vehicle MVS (refer to FIG. 3) can be acquired from among the various pieces of information held by the infrastructure equipment by use of a request from the on-board data communication device 14. For example, if there is insufficient information in the map data stored in the map data storage unit 2 or information that has been updated from the map data, the insufficient information or updated information can be supplemented. It is also possible to acquire traffic information such as traffic congestion information and travel restriction information for the target travel route tL (refer to FIG. 3) on which the host vehicle MVS (refer to FIG. 3) is scheduled to travel.

The map data storage unit 2 is composed of an on-board memory that stores so-called electronic map data, in which latitude/longitude are associated with map information. The map data stored in the map data storage unit 2 are high-precision map data having a level of precision with which it is possible to recognize at least each of the lanes of a road that has a plurality of lanes. By using such high-precision map data, it is possible to generate the linear target travel route tL, indicating in which lane from among the plurality of lanes the host vehicle MVS (refer to FIG. 3) would travel in the autonomous driving. Then, when the host vehicle position detected by the GPS13 is recognized as the host vehicle position information, the high-precision map data around the host vehicle position are sent to the autonomous driving control unit 4.

The high-precision map data includes road information associated with each point, and the road information is defined by nodes, and links that connect the nodes. The road information includes information for identifying the road from the location and area of the road, a road type for each road, a lane width for each road, and road shape information. For each piece of identification information of each road link, the road information is stored in association with the location of the intersection, directions of approach to the intersection, and other intersection-related information. For each piece of identification information of each road link, the road information is stored in association with the road type, the lane width, the road shape, whether through traffic is possible, right-of-way, whether passing is possible (whether or not entering an adjacent lane is possible), the speed limit, signs, and other road-related information.

In addition, information relating to highways and toll roads in the data stored in the map data storage unit 2 includes information regarding toll plazas 100 (refer to FIG. 3) provided at entrances and exits of highways and toll roads. Information relating to the toll plazas 100 includes information about gates 110 (position information and types, such as ETC gates and general gate: refer to FIG. 3) that are installed at the toll plazas 100.

The autonomous driving control unit 4 has a function for integrating information input from the on-board sensor 1 and the map data storage unit 2 to generate the target travel route tL (refer to FIG. 3), a target vehicle speed profile (including acceleration profile and deceleration profile.), and the like. That is, the target travel route tL at the lane of travel level from the current position to a destination is generated based on a prescribed route search method, the high-precision map data from the map data storage unit 2, and the like, and the target vehicle speed profile, etc., along the target travel route tL are generated. In addition, when it is determined that the autonomous driving cannot be maintained as a result of sensing with the on-board sensor 1 while the host vehicle MVS (refer to FIG. 3) is stopped or traveling along the target travel route tL, the target travel route tL, the target vehicle speed profile, and the like, are sequentially corrected.

When the target travel route tL is generated, the autonomous driving control unit 4 calculates a drive command value, a braking command value, and a steering angle command value such that the host vehicle MVS (refer to FIG. 3) travels along the target travel route tL and outputs the calculated command values to the actuator 5. Specifically, the calculation result of the drive command value is output to a drive actuator 51, the calculation result of the braking command value is output to a braking actuator 52, and the calculation result of the steering angle command value is output to a steering angle actuator 53.

The actuator 5 is a control actuator that causes the host vehicle MVS (refer to FIG. 3) to travel and stop along the target travel path tL (refer to FIG. 3) and includes the drive actuator 51, the braking actuator 52, and the steering angle actuator 53.

The drive actuator 51 receives drive command values input from the autonomous driving control unit 4 and controls the driving force that is output to the drive wheels. Examples of the drive actuator 51 that can be used include an engine in the case of an engine-powered vehicle, an engine and a motor/generator (power running) in the case of a hybrid vehicle, and a motor/generator (power running) in the case of an electric vehicle.

The braking actuator 52 receives braking command values input from the autonomous driving control unit 4 and controls the braking force that is output to the drive wheels. Examples of the braking actuator 52 that can be used include a hydraulic booster, an electric booster, a brake fluid pressure actuator, a brake motor actuator, and a motor/generator (regeneration).

The steering angle actuator 53 receives steering angle command values input from the autonomous driving control unit 4 and controls the steering angle of the steered wheels. Examples of the steering angle actuator 53 that can be used include a steering motor, or the like, that is provided in a steering force transmission system of a steering system.

The display device displays on a screen the position of the moving host vehicle MVS on the map (refer to FIG. 3) to provide the driver and passengers with visual information of the host vehicle's location when the vehicle is stopped or traveling by means of autonomous driving. This display device 6 inputs target travel route information, host vehicle position information, destination information, and the like, generated by the autonomous driving control unit 4, and displays on the display screen a map, roads, the target travel route tL (travel route of the host vehicle), the host vehicle location, the destination, and the like, in a readily visible manner.

The input device 7 carries out various inputs by means of driver operation, for which purpose a touch panel function of the display device 6 may be used, for example, as well as other dials and switches. Examples of inputs carried out by the driver include input of information relating to the destination and input of settings such as constant speed travel and following travel during autonomous driving, and the like.

The autonomous driving control system A further comprises the toll plaza passage controller 40 for controlling the actuator 5 during passage through the toll plaza 100. During passage through the toll plaza 100, the toll plaza passage controller 40 switches from a control to cause the host vehicle MVS to travel along the target travel route tL, as described above, to a control to follow a preceding vehicle PV (refer to preceding vehicles PV1, PV2 of FIG. 4), as deemed necessary.

A process flow of a toll plaza passage control process executed by the autonomous driving control system A according to the first embodiment during passage through the toll plaza 100 will be described below based on the flowchart of FIG. 2. The toll plaza passage control is started when the host vehicle MVS (refer to FIG. 3) approaches the vicinity of the toll plaza 100 (refer to FIG. 3), for example, immediately before or after entering a toll plaza area 120 (refer to FIG. 3) where road Ro begins to widen.

In this toll plaza passage control, first, in Step S1, toll plaza information is acquired from the map information stored in the map data storage unit 2. This toll plaza information includes information relating to a gate 110 (refer to FIG. 3), that is, the number, arrangement, type, etc., of each of gates 111-114 at the gate 110 shown in FIG. 3. The type of the gate 110 is distinguished according to the different type of passage modes, such as an ETC (Electronic Toll Collection System) gate, a manned gate, and the like.

Here, one example of the toll plaza 100 is shown in FIG. 3. The toll plaza 100 shown in FIG. 3 has the gate 110 and the toll plaza area 120. The gate 110 is a collective term for a first gate 111, a second gate 112, a third gate 113, and a fourth gate 114. The number of gates comprising the gate 110 is not limited to "4" as shown in the drawing, and may be a larger or smaller number. In addition, the toll plaza area 120 refers to the area where the road is wider than the two-lane road Ro.

Returning to FIG. 2: in Step S2 following Step S1, a target passage gate to be the passage target is set from among the plurality of gates (the first to the fourth gates 111-114 in FIG. 3) of the gate 110 of the toll plaza 100.

Then, in Step S2, the target passage gate is set from among the first to the fourth gates 111-114; in this particular arrangement, if there are a plurality of gates that match the type of passage mode of the host vehicle MVS, a plurality of the target passage gates are also set. In the following description, the first gate 111 and the fourth gate 114 are set as the target passage gates, and the target passage gates are indicated by appending a (t) to the end of the reference symbol of each gate 111, 114. In addition, these plurality of target passage gates $111(t)$, $114(t)$ are collectively called a target passage gate group.

In the subsequent Step S3, a traffic congestion determination is carried out regarding whether there is traffic congestion in the vicinity of the toll plaza 100 (for example, in or just before the toll plaza area 120). Then, if there is traffic congestion, the process proceeds to Step S4, and if there is no traffic congestion, the process proceeds to Step S7.

Here, whether there is traffic congestion can be determined based on the vehicle speed of the host vehicle MVS or the predicted vehicle speed of the host vehicle MVS or another vehicle in the toll plaza area 120; if these vehicle speeds are less than or equal to a preset threshold value, it can be determined that there is traffic congestion.

In addition, a determination of traffic congestions can also be carried out based on vehicle-surroundings information and external information. Here, a determination based on vehicle-surroundings information can be carried out based on, for example, the number of other vehicles present within a prescribed range in front of the host vehicle MVS. In addition, a determination based on external information can be carried out based on, for example, information obtained by means of vehicle-to-vehicle communication, road traffic information called VICS (Vehicle Information and Communication System), or the like.

In Step S7, to which the process proceeds when there is no traffic congestion in the vicinity of the toll plaza 100, one gate from among the target passage gate group is selected as the target passage gate, and the target travel route tL that passes through this target passage gate is generated on the map, as shown in FIG. 3. In addition, in Step S7, the actuator 5 is controlled for travel along the target travel route tL.

For example, during travel in a lane on the left side of the road Ro, as shown in FIG. 3, the target travel route tL is generated, which proceeds along the left edge of the toll plaza area 120 and passes through the target passage gate, here, the leftmost, fourth gate 114. In addition, during travel in a lane on the right side of the road Ro, the target travel route tL may be generated, which runs straight-ahead in the same lane and passes through the target passage gate, here, the rightmost, first gate 111.

During the execution of the process of Step S7, the process proceeds to Step S7a at a prescribed cycle to determine whether a condition to terminate the control to travel along the target travel route tL, which passes through the target passage gate, has been satisfied, and if the termination condition has not been satisfied, the process returns to Step S7 to continue the process. The termination condition includes passing through the gate 110. Therefore, the process of the above-described Step S7 is continued until the gate 110 is passed through. Additionally, the termination condition may include cancellation of the automatic travel operation itself. Examples of cases in which the automatic travel operation is canceled include those in which the driver of the host vehicle MVS selects manual driving, or those in which some abnormality of the autonomous driving control system A is detected.

Figure 4:
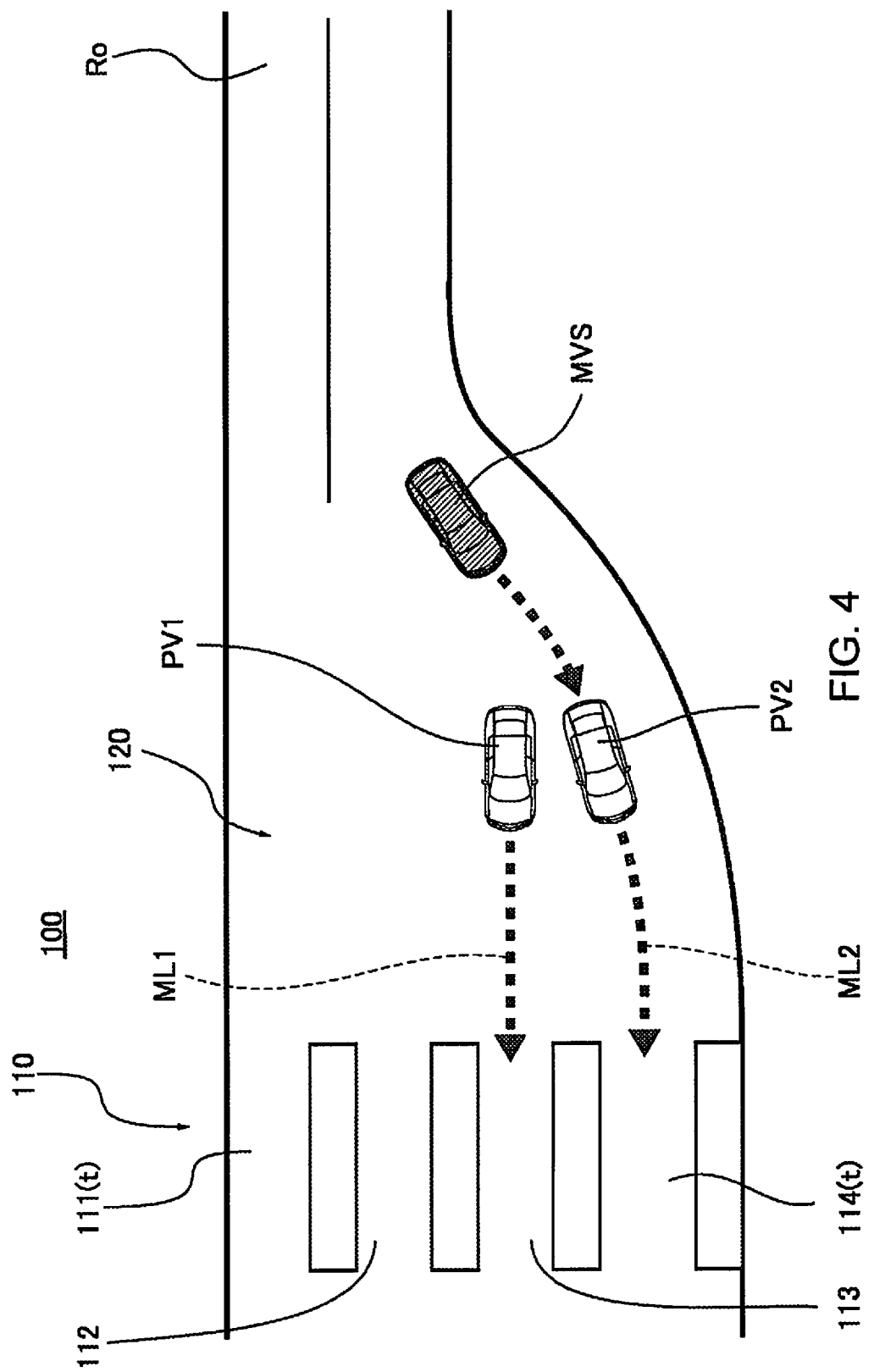
FIG. 4 is a plan view of the toll plaza 100 for explaining one example of a control when a plurality of preceding vehicles PV1, PV2 are present in front of a host vehicle MVS in which the autonomous driving control system A is installed.

On the other hand, in Step S4, to which the process proceeds when there is traffic congestion in the vicinity of the toll plaza 100 in Step S3, the predicted passage gate of the preceding vehicle PV (refer to PV1, PV2 in FIG. 4) is calculated. Here, "preceding vehicle" is a vehicle that is traveling in front of the host vehicle MVS. Additionally, in the description of the Specification below, when reference is made to a specific vehicle from among the preceding vehicles PV1, PV2, etc., as noted in the drawing as shown in FIG. 4, the same reference symbol as that which appears in the drawing is used. On the other hand, when reference is not made to a specific vehicle, for example, when referring to the preceding vehicles PV1, PV2 of FIG. 4 or another vehicle, preceding vehicle PV is used.

Figure 2:
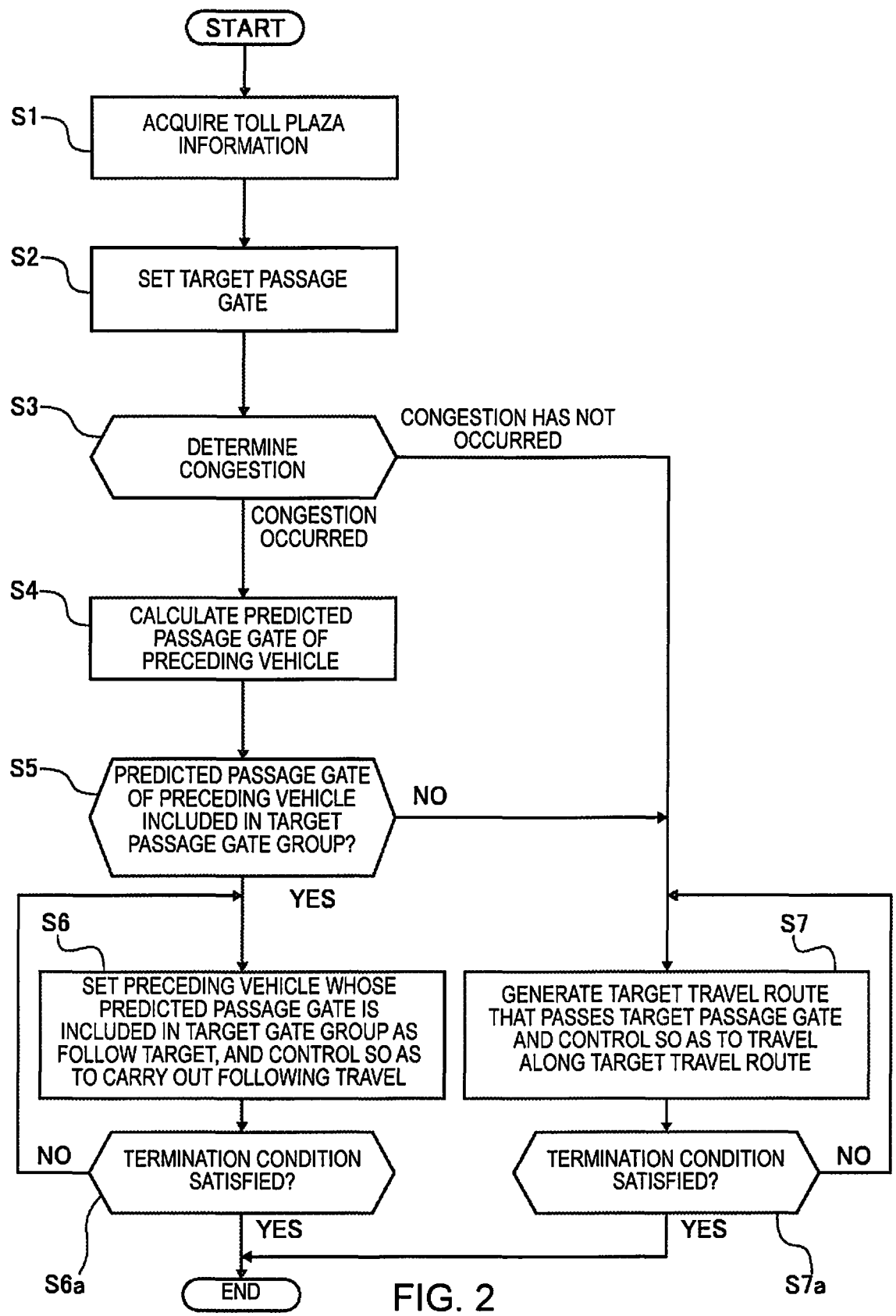
FIG. 2 is a flowchart illustrating a flow of atoll plaza passage control process executed by a toll plaza passage controller 40 of the autonomous driving control system A.

As a method for specifying the preceding vehicle PV to be the target for calculating the predicted passage gate in Step S4 of FIG. 2, for example, all vehicles present in a preset rectangular area in front of the host vehicle MVS may be specified. Alternatively, straight lines may be radially extended from the center of the host vehicle MVS at regular intervals in a region in front of the host vehicle MVS, and the first vehicle that intersects one of the straight lines may be specified.

In addition, since this step S4 is a step to which the process proceeds when it is determined that there is traffic congestion, FIG. 4 shows a plurality of the preceding vehicles PV1, PV2. In the example shown in FIG. 4, the predicted passage gates of the target preceding vehicles PV1, PV2 are calculated. The calculation of these predicted passage gates is carried out by first calculating the destination (for example, by calculating the destinations indicated by arrows ML1, ML2) of each of the preceding vehicles PV1, PV2 from the position, orientation, speed, and angular velocity of each of the preceding vehicles PV1, PV2. The predicted passage gates of the preceding vehicles PV1, PV2 are then obtained by determining with which of the first to the fourth gates 111-114 of the toll plaza 100 on the map the calculated destinations coincide. For example, in the example shown in FIG. 4, the third gate 113 is the predicted passage gate of the preceding vehicle PV1, and the fourth gate 114 is the predicted passage gate of the preceding vehicle PV2.

Then, in Step S5 shown in FIG. 2, it is determined whether the predicted passage gates of the plurality of preceding vehicles PV1, PV2 are included in the target passage gate group set in Step S2. That is, it is determined whether there are preceding vehicles PV1, PV2 whose predicted passage gates match the target passage gates 111($t$), 114($t$) of the host vehicle MVS. Then, if the predicted passage gate is included in the target passage gate group, the process proceeds to Step S6; and if the predicted passage gate is not included in the target passage gate group, the process proceeds to Step S7.

In Step S6, the preceding vehicle PV whose predicted passage gate is included in the target passage gate group is set as the follow target. Specifically, in the example shown in FIG. 4, the preceding vehicle PV2 whose predicted passage gate is the fourth gate 114($t$), which is the target passage gate of the host vehicle MVS, is set as the follow target.

Then, in Step S6, a following control for controlling the actuator 5 such that the host vehicle MVS follows the preceding vehicle PV2 is executed. As is well known, there are various types of control for realizing following control, and any technique commonly used for autonomous driving assistance on highways may be used, for example. Specifically, the position and speed of the preceding vehicle PV2 is detected from moment to moment using the camera 11 or the radar 12, and the vehicle is controlled to follow the travel route of the preceding vehicle PV2 as the prescribed relative speed and inter-vehicular distance with respect to the preceding vehicle PV2 are controlled.

During the execution of the process of Step S6, the process proceeds to Step S6a at a prescribed cycle (with a period, for example, of about 30 msec) to determine whether a termination condition has been satisfied, in the same manner as in the above-described Step S7a, and the following control of Step S6 is continued until the termination condition is satisfied.

On the other hand, if none of the predicted passage gates of the preceding vehicles PV is included in the target passage gate group in Step S5, the process proceeds to Step S7, and a control is carried out for travel along the target travel route tL (refer to FIG. 3) generated on the map, in the same manner as when there is no traffic congestion.

The actions of the first embodiment will be described next, but before this explanation, the problem to be solved by the first embodiment will be described.

When the target travel route tL is generated, the white lines that divide the lanes at the toll plaza 100 are not drawn;

however as shown in FIG. 3, the dotted lines CL1, CL2, CL3 that pass through the first to the third gates 111, 112, 113 on the map data define the center-of-travel lines. Therefore, when the target travel route tL is generated, it is generated along these center lines (dotted lines CL1, CL2, CL3). In addition, in FIG. 3, the target travel route tL is generated along the center line that passes through the fourth gate 114.

Figure 5:
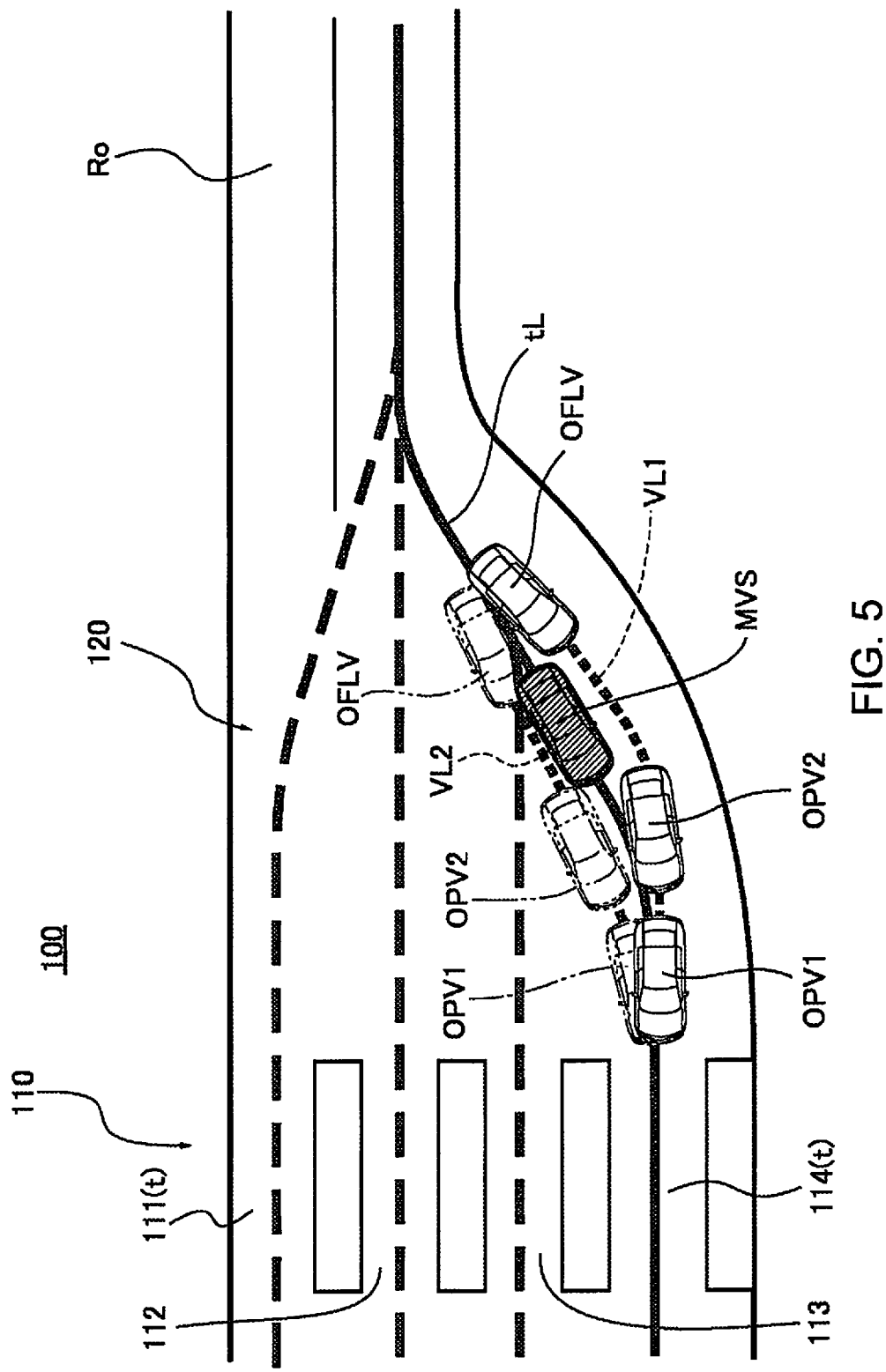
FIG. 5 is a plan view of the toll plaza 100 for explaining a problem to be solved by the first embodiment.

If there is traffic congestion in the toll plaza 100, lines of vehicles form toward each of the first to the fourth gates 111-114. FIG. 5 shows one such example, illustrating a case in which vehicle line VL1 and vehicle line VL2 form toward the fourth gate 114. Since the white lines that divide lanes are not drawn in the toll plaza 100, these vehicle lines VL1, VL2 are formed in an irregular manner. Therefore, there are cases in which the vehicle lines VL1, VL2 deviate from the center line defined on the map (shown as the target travel route tL in FIG. 5).

When such vehicle lines VL1, VL2 form, if the host vehicle MVS is controlled to travel along the target travel route tL generated on the map, the position of the host vehicle MVS deviates from the vehicle line VL1 and the vehicle line VL2. In such a case, there is the risk that the driver of the host vehicle MVS will experience discomfort, as will the drivers of preceding vehicles OPV1, OPV2 and trailing vehicle OFLV in the vicinity.

In contrast, in the first embodiment, execution of the toll plaza passage control prevents the host vehicle MVS from deviating from the vehicle lines VL1, VL2, as described above, and thus it is possible to prevent the driver from experiencing discomfort.

One execution example of the toll plaza passage control when the host vehicle MVS passes through the toll plaza 100 in the first embodiment will be described step by step. First, as shown in FIG. 3, in the first embodiment, when the host vehicle MVS approaches the toll plaza 100, a target passage gate is set in the gate 110 (S2). In the example shown in FIG. 4, the first gate 111 and the fourth gate 114 are respectively set as the target passage gates 111(t) and 114(t).

Then, if there is traffic congestion in the toll plaza area 120, the predicted passage gate of each of the plurality of preceding vehicles PV1, PV2 in front of the host vehicle MVS is calculated (S4). In the example shown in FIG. 4, the third gate 113 is calculated as the predicted passage gate of the preceding vehicle PV1, and the fourth gate 114 is calculated as the predicted passage gate of the preceding vehicle PV2.

In addition, the presence or absence of the preceding vehicle PV whose predicted passage gate (third gate 113, fourth gate 114) is included in the target passage gate group (that is, the predicted passage gate matching one of the target passage gates 111(t), 114(t)) is determined (S5).

Then, if the preceding vehicle PV whose predicted passage gate is included in the target passage gate group is present, the corresponding preceding vehicle PV (preceding vehicle PV2 in FIG. 4) is set as the follow target, and the actuator 5 is controlled such that the host vehicle MVS follows the preceding vehicle PV2 (S6). This following travel is continued until the termination condition is satisfied, that is, until the host vehicle MVS passes through the gate 110.

In this manner, in a situation in which traffic congestion occurs in the toll plaza area 120 and the vehicle lines VL1, VL2 form, the host vehicle MVS is controlled to follow the preceding vehicle PV2 rather than being controlled to travel along the target travel route tL. Therefore, as shown in FIG. 5, it is possible to prevent the host vehicle MVS from deviating from the vehicle lines VL1, VL2 and to prevent the driver of the host vehicle MVS, as well as drivers of the preceding vehicles OPV1, OPV2 and the trailing vehicle OFLV in the vicinity, from experiencing discomfort.

The effects of the autonomous driving control method and the autonomous driving control system according to the first embodiment will be listed below. (a) The autonomous driving control method executed by the autonomous driving control system A according to the first embodiment is an autonomous driving control method carried out by the autonomous driving control system A having the autonomous driving control unit 4 as a controller that executes autonomous driving control for causing the host vehicle MVS to travel along the target travel route tL generated on the map, comprising setting one or a plurality of target passage gates though which the host vehicle MVS is scheduled to pass from among the first to the fourth gates 111-114 of the toll plaza 100, when passing through the toll plaza 100 while traveling along the target travel route tL (Step S2), obtaining predicted passage gates of the plurality of preceding vehicles PV1, PV2 that are traveling in front of the host vehicle MVS (Step S4), determining the presence or absence of the preceding vehicles PV1, PV2 that have predicted passage gates that match the target passage gates of the host vehicle MVS (Step S5), and carrying out following travel when the preceding vehicle PV2 that has the predicted passage gate that matches the target passage gate is present, using the preceding vehicle PV2 as the follow target (Step S6). Thus, even when autonomous driving control is executed for travel along the target travel route tL on the map, if the vehicle lines VL1, VL2 form at the gate 110 in the toll plaza 100, it is possible for the host vehicle MVS to follow the preceding vehicle PV such that the host vehicle does not deviate from the vehicle lines VL1, VL2. Therefore, it is possible to prevent the host vehicle MVS from deviating from the vehicle lines VL1, VL2 and to prevent the driver of the host vehicle MVS, as well as drivers in the vicinity, from experiencing discomfort.

(b) In the autonomous driving control method executed by the autonomous driving control system A according to the first embodiment, when passing through the toll plaza 100, each of the Steps S4, S5, S6 is executed when there is traffic congestion in which the vehicle speed of the host vehicle MVS or the predicted vehicle speed of the host vehicle MVS becomes less than or equal to a prescribed vehicle speed; and when there is no traffic congestion, autonomous driving control is executed for travel along the target travel route tL (Step S7). Therefore, when there is traffic congestion in the toll plaza 100 in which the vehicle lines VL1, VL2, etc., form, it is possible for the host vehicle MVS to reliably follow the preceding vehicle PV such that the host vehicle does not deviate from the vehicle lines VL1, VL2, etc.

(c) The autonomous driving control system A according to the first embodiment comprises the autonomous driving control unit 4 that executes autonomous driving control for driving the actuator 5 that controls the travel state of the host vehicle MVS to cause the host vehicle MVS to travel along the target travel route tL generated on the map, based on information of the surroundings of the host vehicle MVS and information relating to the travel of the host vehicle MVS, wherein the autonomous driving control unit 4 has the toll plaza passage controller 40, including a section that carries out the process of Step S2 as the target passage gate setting unit for setting one or a plurality of target passage gates through which the host vehicle MVS is scheduled to pass from among the first to the fourth gates 111-114 of the tollplaza 100, when passing through the toll plaza 100 during travel along the target travel route tL, a section that carries out the process of Step S4 as the predicted passage gate determination unit for obtaining predicted passage gates of the plurality of preceding vehicles PV1, PV2 that travel in front of the host vehicle MVS, a section that carries out the process of Step S5 as the preceding vehicle presence/absence determination unit for determining the presence or absence of the preceding vehicle PV2 that has the predicted passage gate that matches the target passage gate of the host vehicle MVS, and a section that carries out the process of Step S6 as the following travel control unit for controlling the actuator 5 to carry out following travel when the preceding vehicle PV2 that has the predicted passage gate that matches the target passage gate is present, using the preceding vehicle PV2 as the follow target. Therefore, as described in (a) above, if the vehicle lines VL1, VL2 form at the gate 110, it is possible to prevent the host vehicle MVS from deviating from the vehicle lines VL1, VL2. Therefore, it is possible to prevent the driver of the host vehicle MVS, as well as drivers in the vicinity, from experiencing discomfort.

Other Embodiments

Other embodiments will be described below. In the descriptions of the other embodiments, common configurations have been assigned the same reference symbols and only the differences therefrom will be described.

Figure 6:
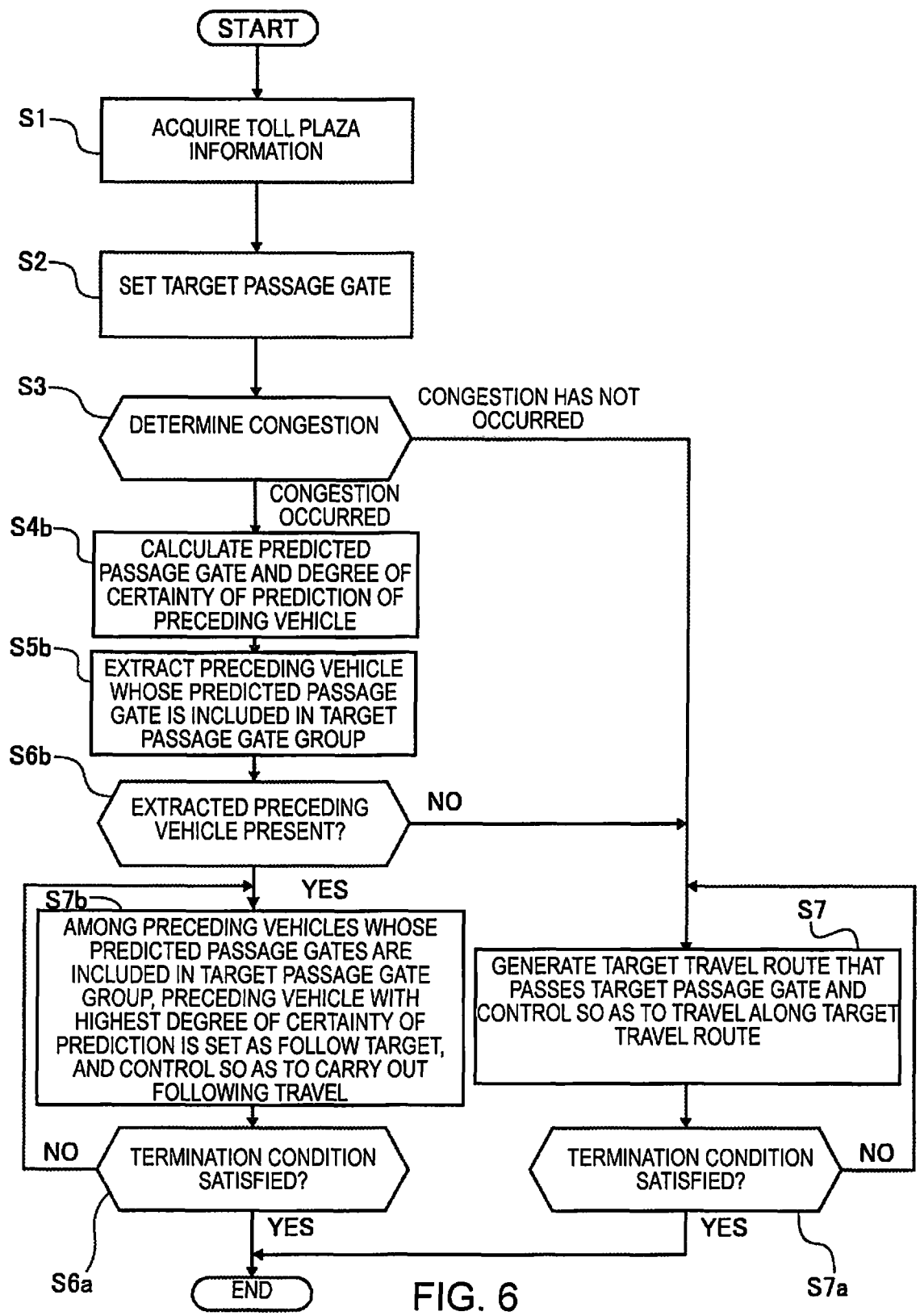
FIG. 6 is a flowchart illustrating a flow of the toll plaza passage control process according to a second embodiment.

First, the toll plaza passage control in a second embodiment will be described based on the flowchart of FIG. 6. Steps that are common to those in the first embodiment have been assigned the same reference symbols as in the first embodiment, and the descriptions thereof have been omitted.

The second embodiment is an example in which a vehicle, from among the plurality of preceding vehicles PV whose predicted passage gate matches the target passage gate group, having the highest degree of certainty of prediction $\Omega_g$, which is the degree of certainty of passing through the predicted passage gate, is set as the follow target. That is, in the second embodiment, the content of the process following Step S3 is different.

In Step S4b following Step S3, in addition to the calculation of the predicted passage gates of the preceding vehicles PV, the degree of certainty of prediction $\Omega_g$, which is the degree of certainty of passage through each of the predicted passage gates, is calculated based on the distance and the shape of the predicted trajectory to the gate 110 (predicted position of the preceding vehicle PV), and the like.

The "degree of certainty of prediction $\Omega_g$" will be described here. The degree of certainty of prediction $\Omega_g$ is an index value representing the probability that the preceding vehicle PV will pass through the predicted passage gate, and is calculated by means of the following formula (1), for example.

$$\Omega_g = \omega_g / (\Sigma_N \omega_N) \quad (1)$$

$\omega_g$: likelihood of passage through the target passage gate (likelihood)
$\omega_N$: likelihood of passage through gate N (likelihood)

In addition, the likelihood $\omega_N$ of passage through the gate N can be calculated from the following formula (2).

$$\omega_N = [1/((2\pi)^2|C|)^{1/2}] \exp((-\tfrac{1}{2})(P_N - P_v)^T \cdot C^{(-1)} \cdot (P_N - P_v)) \quad (2)$$

$P_N$: position of the gate
$P_v$: predicted position of the preceding vehicle (predicted position up to the predicted gate passage time)
C: error variance matrix of the predicted position of the preceding vehicle As described above, CON is the likelihood that the preceding vehicle PV will pass through the gate N, and is a common probability distribution function of a general normal distribution. The likelihood ON decreases as the future predicted position $P_v$ of the preceding vehicle PV and the gate position $P_N$ become farther apart. In addition, the likelihood $\omega_N$ decreases as the error variance C of the predicted position increases, regardless of the magnitude of $(P_N - P_v)$.

The degree of certainty of prediction $\Omega_g$ is calculated using the ratio of likelihood $\omega_g$ of the target passage gate with respect to the sum of the likelihoods (ON calculated for all of the gates 110. Thus, even if the destination of the preceding vehicle PV matches the target passage gate, when the error variance C of the predicted position $P_v$ is large, the differences in the likelihood will tend to be small between the gates, so that the degree of certainty of prediction $\Omega_g$ decreases.

The error variance C is a parameter that increases in accordance with the predicted time width (amount of movement to the gate). In addition, the error variance C may also increase in accordance with the state of motion of the vehicle (example: whether the vehicle is meandering, the observation state (example: whether it is infrequently captured by the camera), or the like.

In Step S5b following Step S4b, in which the predicted passage gate and the degree of certainty of prediction $\Omega_g$ are calculated, the preceding vehicle PV whose predicted passage gate is included in the target passage gate group is extracted. In this case, regardless of whether there is one or a plurality of preceding vehicles PV whose predicted passage gates are included in the target passage gate group, all of the preceding vehicles are extracted. Furthermore, in the subsequent Step S6b, the presence or absence of the extracted preceding vehicle PV is determined, and if the extracted preceding vehicle PV is present, the process proceeds to Step S7b; and if not, the process proceeds to Step S7.

In Step S7b, to which the process proceeds if the preceding vehicles PV are extracted, the preceding vehicle PV with the highest degree of certainty of prediction $\Omega_g$, which is the degree of certainty of passing through each of the predicted passage gates, is set as the follow target, and following control is carried out so that the preceding vehicle PV is followed. When there is one extracted preceding vehicle PV, the preceding vehicle PV is set as the follow target as the preceding vehicle PV with the highest degree of certainty of prediction $\Omega_g$. When there is a plurality of the extracted preceding vehicles PV, the vehicle with the highest degree of certainty of prediction $\Omega_g$ value from among the plurality of preceding vehicles PV is set as the follow target.

Figure 7:
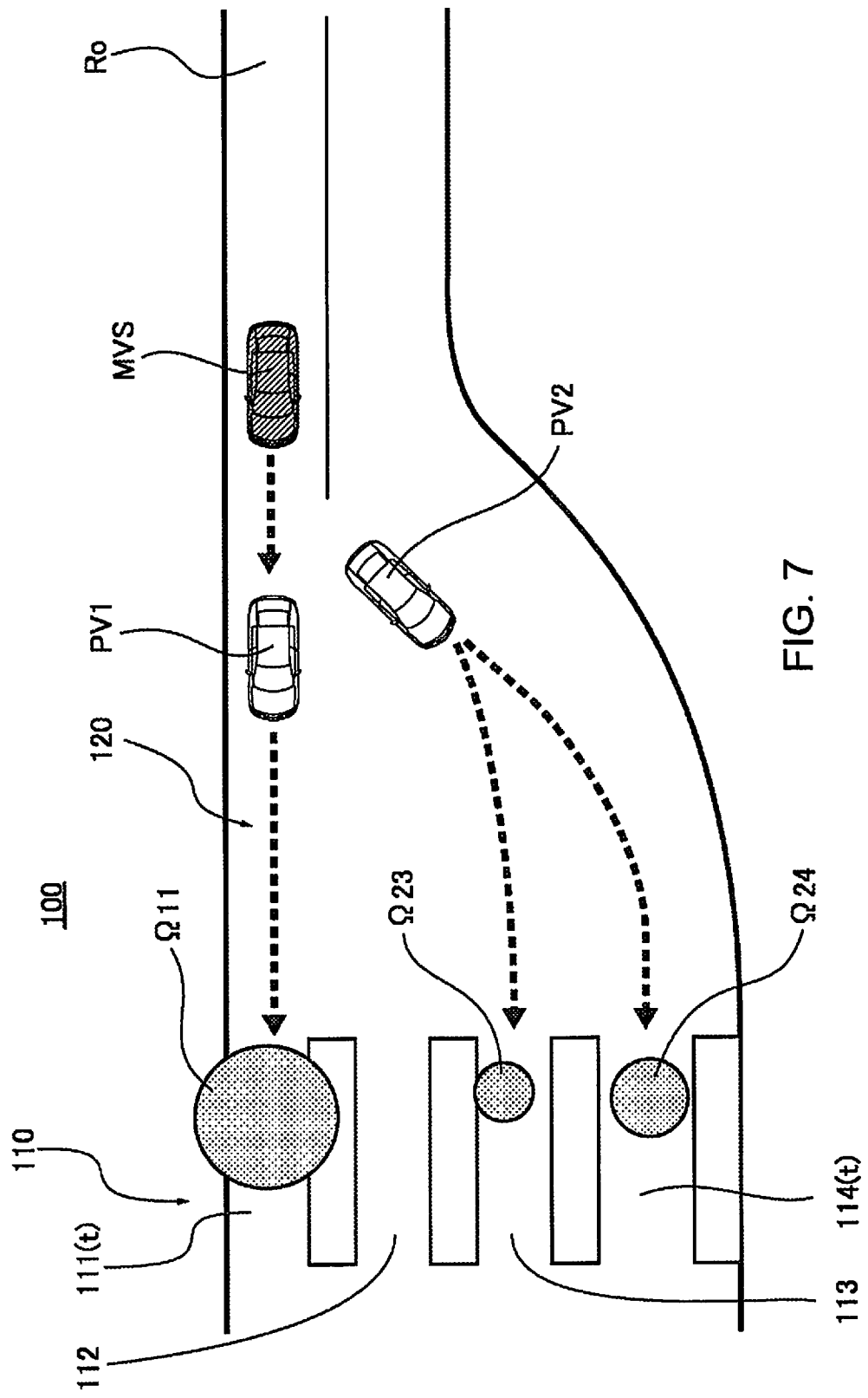
FIG. 7 is a plan view of the toll plaza 100 for explaining a travel control of the host vehicle MVS according to the second embodiment.

The action of the second embodiment will be described next based on FIG. 7. FIG. 7 illustrates a case in which there is traffic congestion at the toll plaza 100, and there are, in front of the host vehicle MVS, preceding vehicles PV1, PV2 having predicted passage gates that match the target passage gate group (target passage gates 111(t), 114(t)) of the host vehicle MVS. In this case, in the second embodiment, the degree of certainty of prediction Qs of each of the preceding vehicles PV1, PV2 is calculated (Step S7b).

In FIG. 7, the degree of certainty of prediction $\Omega_g$ that the preceding vehicle PV1 passes through the gate 111 is represented by a circle Ω211. Additionally, the degree of certainty of prediction $\Omega_g$ that the preceding vehicle PV2 passes through the gate 113 is represented by a circle 9223, and the degree of certainty of prediction $\Omega_g$ that the preceding vehicle PV2 passes through the gate 114 is represented by a circle 9224. The size (diameter) of each of the circles $\Omega 211$, $\Omega 223$, $\Omega 224$ represents the magnitude of the value of the degree of certainty of prediction $\Omega_g$.

At this time, the traveling distance to the target passage gate (fourth gate 114(t)) is longer for the preceding vehicle PV2 than that for the preceding vehicle PV1. Therefore, the error variance C of the predicted position becomes greater for the preceding vehicle PV1 than for the preceding vehicle PV2, so that the degree of certainty of prediction $\Omega_g$ of the preceding vehicle PV1 becomes a higher value than the degree of certainty of prediction $\Omega_g$ of the preceding vehicle PV2.

That is, the probability that the preceding vehicle PV2 passes through the fourth gate 114(t) included in the target passage gate group is lower than the probability that the preceding vehicle PV1 passes through the first gate 111(t) included in the target passage gate group. Moreover, the preceding vehicle PV2 may turn midway and pass through the gate 113 not included in the target passage gate group. Therefore, following control is carried out, using the preceding vehicle PV1 with the highest degree of certainty of prediction $\Omega_g$ as the follow target (Step S7b).

(d) In the autonomous driving control method executed by the autonomous driving control system A according to the second embodiment described above, when obtaining the predicted passage gates of a plurality of preceding vehicles PV (Step S4b), the degree of certainty of prediction $\Omega_g$, which is the degree of certainty that each of the preceding vehicles PV passes through the predicted passage gates, is calculated, and when there is a plurality of the preceding vehicles PV1, PV2 that have the predicted passage gates that match the target passage gates, the preceding vehicle PV1 with the highest degree of certainty of prediction 92g is set as the follow target (Step S7b). Therefore, it is possible to set the preceding vehicle PV1 which has a high probability of heading toward the target passage gate of the host vehicle MVS as the follow target, to thereby pass through the target passage gate by means of following travel with a high probability. That is, it is possible to prevent the preceding vehicle PV2, which is likely to proceed to a gate (third gate 113) other than the target passage gate (fourth gate 114), from being set as the follow target, thereby entering the line of vehicles with high accuracy and pass through the target passage gate.

Figure 8:
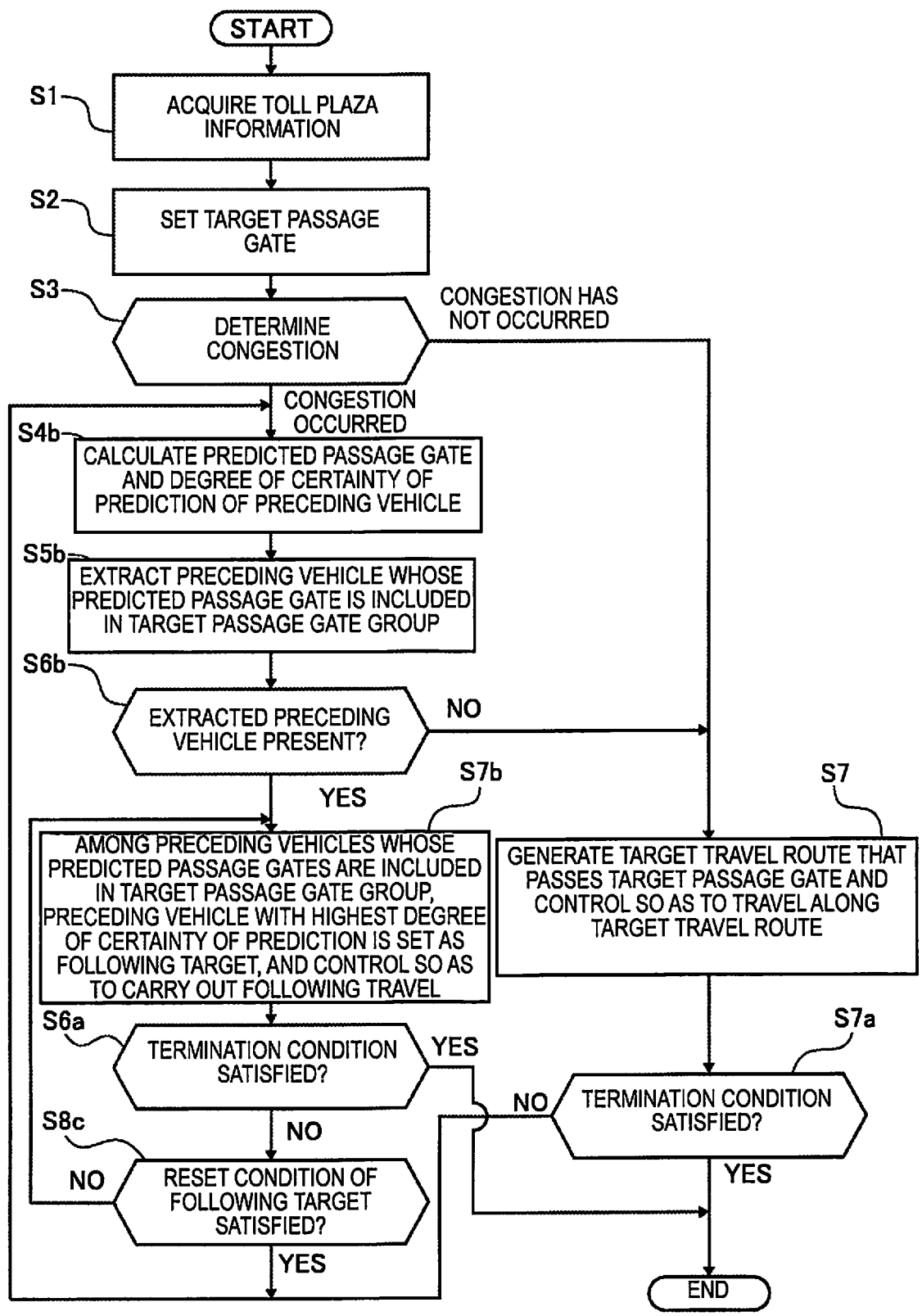
FIG. 8 is a flowchart illustrating a flow of the toll plaza passage control process according to a third embodiment.

Next, the toll plaza passage control in a third embodiment will be described based on the flowchart of FIG. 8. The third embodiment is a modification variant of the second embodiment, and is an example that can accommodate cases in which the preceding vehicle PV that is set as the follow target based on the degree of certainty of prediction $\Omega_g$ changes course, such as heading toward a gate that is different from the predicted passage gate.

The differences between the third embodiment and the second embodiment lie the following two points. The first point is that a Step S8c, in which a satisfaction determination of a reset condition of the follow target is repeated until the termination condition is satisfied in Step S6a, has been added. The second point is that, even during travel along the target travel route in Step S7, the presence or absence of a preceding vehicle to be the follow target is constantly determined, and when a follow target is found, there is a switch to following travel.

In Step S8c, to which the process proceeds when the termination condition is not satisfied in Step S6a for determining the termination condition, it is determined whether a reset condition of the follow target is satisfied. Then, if the reset condition is satisfied, the process returns to Step S4b, and the processes of Steps S4b, S5b, S6b, S7b, from obtaining the predicted passage gates of the preceding vehicles PV to carrying out the following travel, are again performed. If the reset condition is not satisfied, the process returns to Step S7b.

Here, the reset condition in Step S8c is set as a case in which the travel state of the preceding vehicle PV deviates from the target travel route tL generated on the map by at least a set value, and a case in which the elapsed time from the start of the following control exceeds a prescribed time. The travel state of the preceding vehicle PV that has deviated from the target travel route tL by at least a set value means a case in which the position or orientation of the preceding vehicle PV has deviated from the target travel route tL. Specifically, cases in which the position of the preceding vehicle PV has deviated from the target travel route tL to exceed a threshold value Llim (refer to FIG. 9), and cases in which the travel direction of the preceding vehicle PV has deviated from the direction of the target travel route tL to exceed a prescribed angle are included.

If the preceding vehicle PV, which is the follow target, deviates from the target travel route tL generated on the map, there is a probability that the preceding vehicle PV will change course, that is, there is a probability that the preceding vehicle will head toward a predicted passage gate that differs from the predicted passage gate that matches the target passage gate. In this case, as shown in FIG. 5 the threshold value Llim for determining that the vehicle has deviated from the target travel route tL oriented toward the predicted passage gate is set in consideration of the probability that the vehicle lines VL1, VL2 that naturally form will deviate from the target travel route tL generated on the map, so as to allow for this level of deviation. Similarly, the angle for determining that the preceding vehicle PV has deviated from the target travel route tL is set to an angle that allows for the vehicle lines VL1, VL2 oriented toward the target passage gate, such as those shown in FIG. 5.

In addition, the redetermination based on the elapsed time from the start of the following control aims to accommodate a change in course of the preceding vehicle PV as the follow target by executing the redetermination at a set cycle. By setting the execution cycle for the determination of the satisfaction of this reset condition to a relatively short value, quick reactions to a change in course of the preceding vehicle PV are possible. On the other hand, if the cycle is set too short, it is likely that the preceding vehicle PV, which is the follow target, will be switched frequently, which may result in changes in vehicle behavior or an excessive calculation load, so that the cycle is set long enough to prevent such adverse effects. Specifically, the cycle is preferably in the range of about 0.1 to 1 second.

Figure 9:
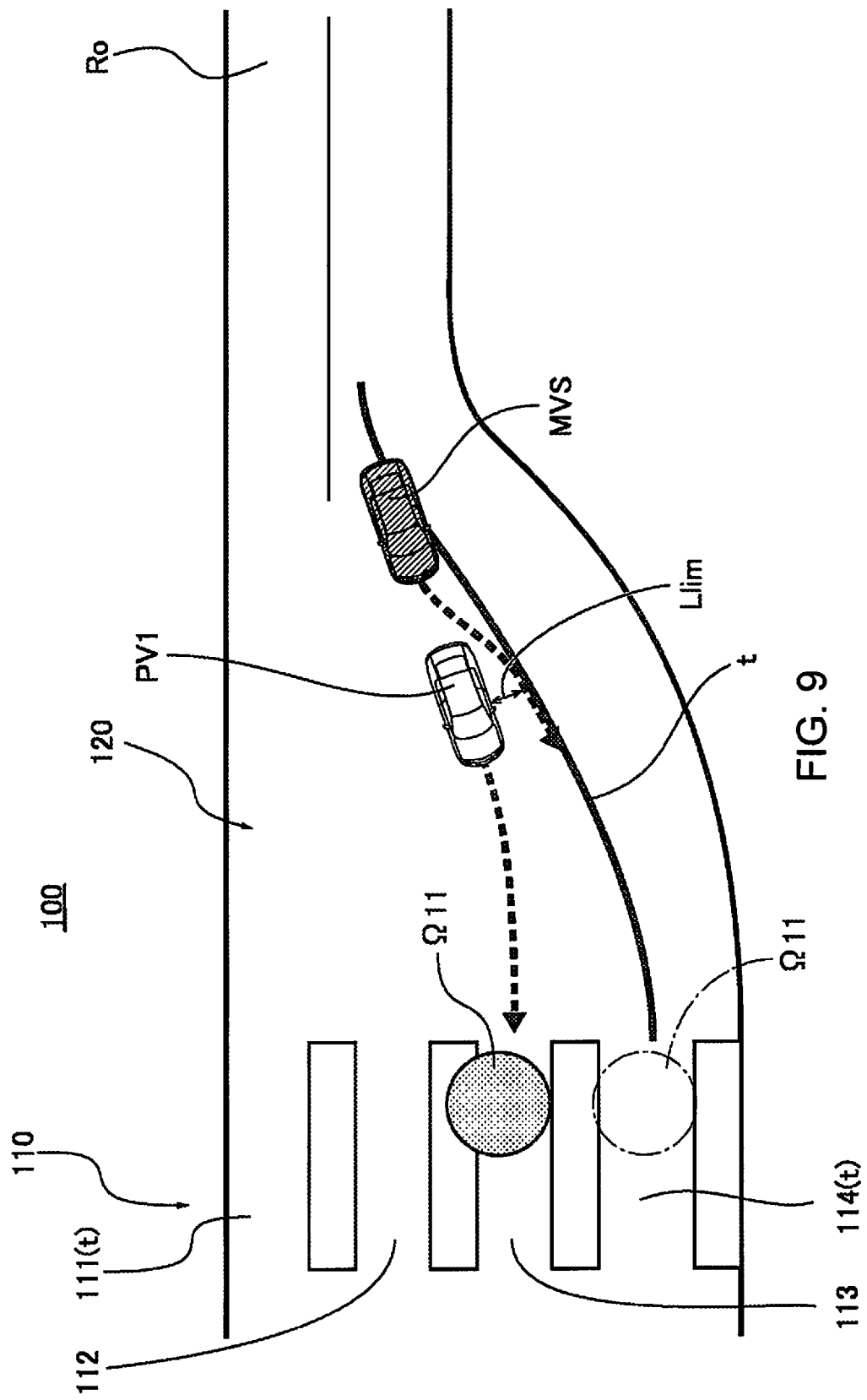
FIG. 9 is a plan view of the toll plaza 100 for explaining a travel control of the host vehicle MVS according to the third embodiment.

The action of the third embodiment will now be described based on FIG. 9. FIG. 9 illustrates a case in which, when the preceding vehicle PV1, for which there is a high probability of the gate 114 (the circle 211 of the chain double-dashed line) becoming the predicted passage gate, is followed, the preceding vehicle PV1 heads instead toward the third gate 113, which is not included in the target passage gate group.

As shown in FIG. 9, when the distance between the preceding vehicle PV1 and the target travel route tL oriented toward the target passage gate (fourth gate 114(t)) exceeds the threshold value Llim, or when a determination of the reset condition is carried out at that timing, the reset condition is satisfied. In FIG. 9, the degree of certainty of prediction when the fourth gate 114 is calculated as the predicted passage gate of the preceding vehicle PV1 is indicated by the chain double-dashed line circle Ω211, and, thereafter, the degree of certainty of prediction when the third gate 113 is calculated as the predicted passage gate is indicated by the solid line circle Ω211.

In this case, since there is no longer the preceding vehicle PV whose predicted passage gate is included in the target passage gate group, the following travel is ended and a control to travel along the target travel route tL is carried out (the process proceeds from S6b to S7). Thus, even if the preceding vehicle PV1 set as the follow target changes course, it is possible to move to the desired target passage gate (fourth gate 114(t)).

(d) In the autonomous driving control method executed by the autonomous driving control system A according to the third embodiment described above, when the preceding vehicle PV is followed (Step S7b), upon determining whether a reset condition of the follow target is satisfied (Step S8c), where the reset condition includes cases in which the travel state of the preceding vehicle PV set as the follow target deviates from the target travel route tL by at least a prescribed amount, and if the reset condition is satisfied, steps (Steps S4b, S5b, S6b, S7b), from obtaining the predicted passage gates of one or a plurality of the preceding vehicles PV traveling in front of the host vehicle MVS to carrying out the following travel using the preceding vehicle PV as the follow target, are again performed. Therefore, even if the preceding vehicle PV1 set as the follow target changes course to a direction different from that of the target passage gate, it is possible to reliably guide the host vehicle MVS to the target passage gate 114(t).

The autonomous driving control method and the autonomous driving control system according to the present disclosure have been described above based on the embodiments. However, specific configurations are not limited to these embodiments, and various modifications and additions to the design can be made without departing from the scope of the invention according to each claim in the Claims.

For example, in the embodiments examples were shown in which two gates (first gate 111, fourth gate 114) are set as the target passage gates when the target passage gates of the host vehicle MVS are set, but the number of target passage gates is not limited to "2." For example, if the number of gates in the toll plaza or the number of passable types of gates is small, there are cases in which the number of the target passage gates may be 1, which is less than 2. Conversely, if the number of gates in the toll plaza or the number of passable types of gates is large, the number of the target passage gates may be set to three or more.

Additionally, in the third embodiment the reset conditions were a prescribed cycle and a deviation from the target travel route tL that exceeded the threshold value Llim and a prescribed cycle, but the use of only one of these is acceptable.

The invention claimed is:

1. An autonomous driving control method carried out by an autonomous driving control system using a controller that executes an autonomous driving control for causing a host vehicle to travel along a target travel route generated on a map, the autonomous driving control method comprising:
setting one or a plurality of target passage gates through which the host vehicle is scheduled to pass from among a plurality of gates of a toll plaza, during passage through the toll plaza while traveling along the target travel route;
determining whether there is traffic congestion near the toll plaza, including in or before a toll plaza area;
executing an autonomous driving control for causing the host vehicle to travel along the target travel route upon determining there is no traffic congestion;
determining a presence or absence of at least one preceding vehicle that has the predicted passage gate that matches the target passage gate of the host vehicle; and
carrying out following travel using the preceding vehicle as a follow target upon determining there is traffic congestion and the preceding vehicle that has the predicted passage gate that matches the target passage gate is present; and
executing the autonomous driving control for causing the host vehicle to travel along the target travel route upon determining there is traffic congestion and the preceding vehicle that has the predicted passage gate that matches the target passage gate is not present.

2. The autonomous driving control method according to claim 1, further comprising
upon determining there is traffic congestion and determining the presence or absence of the preceding vehicle having the predicted passage gate that matches the target passage gate, calculating a degree of certainty of prediction that the preceding vehicle passes through the predicted passage gate, and
setting the preceding vehicle with a highest degree of certainty of prediction as the follow target to carry out the following travel until the host vehicle passes through the target passage gate when there is a plurality of the receding vehicles that have the predicted passage gates that match the target passage gates.

3. The autonomous driving control method according to claim 1, wherein
determining whether or not a reset condition of the follow target is satisfied when following the preceding vehicle where the reset condition includes a case in which a travel state of the preceding vehicle that is set as the follow target deviates from the target travel route by a prescribed amount or more, and
performing again a process from the obtaining of the predicted passage gate of the preceding vehicle to the carrying out of the following travel with respect to the follow target upon determining the reset condition is satisfied.

4. The autonomous driving control method according to claim 1, wherein
the traffic congestion is determined to exist when a vehicle speed of the host vehicle or a predicted vehicle speed of the host vehicle is less than or equal to a prescribed vehicle speed, and
the traffic congestion is determined not to exist when the vehicle speed of the host vehicle or the predicted vehicle speed of the host vehicle is higher than the prescribed vehicle speed.

5. An autonomous driving control system comprising:
a controller that executes an autonomous driving control for driving an actuator that controls a travel state of a host vehicle to cause the host vehicle to travel along a target travel route generated on a map, based on information of a surroundings of the host vehicle and information related to the travel of the host vehicle,
the controller including
a target passage gate setting unit configured to set one or a plurality of target passage gates through which the host vehicle is scheduled to pass from among a plurality of gates of a toll plaza, during passage through the toll plaza while traveling along the target travel route, a predicted passage gate determination unit configured to obtain a predicted passage gate of at least one preceding vehicle that is traveling in front of the host vehicle, a preceding vehicle presence/absence determination unit configured to determine a presence or absence of the preceding vehicle that has the predicted passage gate that matches the target passage gate of the host vehicle, a following travel control unit configured to control the actuator to carry out a following travel using the preceding vehicle as the follow target when the preceding vehicle that has the predicted passage gate that matches the target passage gate is present, and a traffic congestion determination unit configured to determine whether there is traffic congestion near a toll plaza, including in or before a toll plaza area, during passage through the toll plaza while traveling along the target travel route, the controller is configured to execute the autonomous driving control for causing the host vehicle to travel along the target travel route upon the congestion determination unit determining that there is no traffic congestion, carry out the following travel using the preceding vehicle as the follow target upon the congestion determination unit determining there is traffic congestion based on a determination of the predicted passage gate of the preceding vehicle by the predicted passage gate determination unit and the preceding vehicle presence/absence determination unit determining the preceding vehicle that has the predicted passage gate that matches the target passage gate is present, and on the other hand, execute the autonomous driving control for causing a vehicle to travel along the target travel route upon the congestion determination unit determining there is traffic congestion based on a determination of the predicted passage gate of the preceding vehicle by the predicted passage gate determination unit and the preceding vehicle presence/absence determination unit determining the preceding vehicle that has the predicted passage gate that matches the target passage gate is not present.

* * * * *